United States Patent Office 3,334,516
Patented Aug. 8, 1967

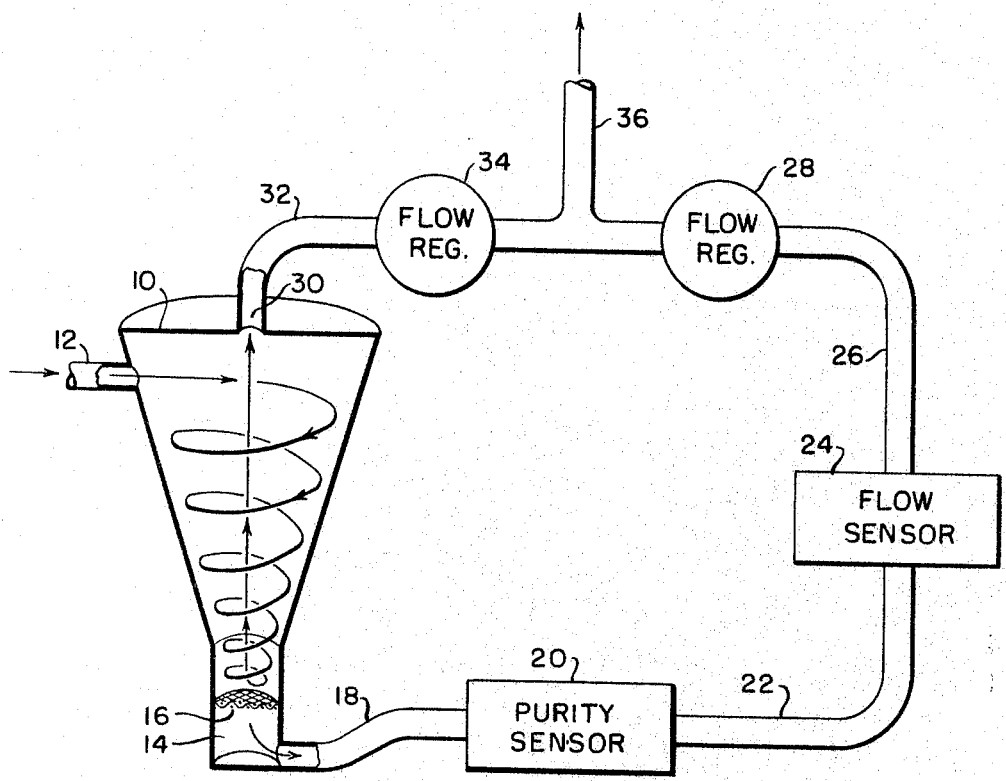

3,334,516
CONTINUOUS FLUID PURITY MONITOR
Nicholas J. Cedrone, Wayland, Mass., assignor to Millipore Corporation, a corporation of Massachusetts
Filed Mar. 16, 1964, Ser. No. 352,263
2 Claims. (Cl. 73—61)

This invention relates to an improved fluid testing system, and more particularly to a fluid purity monitor for continuously testing a fluid stream for contamination by solid particles.

There are many devices for continuously testing the contamination of a fluid by solid particles. One type of device electrically senses the capacitance of the fluid stream, variations of which indicate changes in the constituents of the stream, and may be directly related to its contamination by solid particles. In addition to this qualitative test, such devices also may quantitatively sense the degree of contamination by sensing the actual change in capacitance of the fluid stream. Examples of such fluid purity sensing devices are set forth in the United States Patent No. 1,601,383, issued Sept. 28, 1926 to Emery W. Todd and entitled, "Liquid Testing Apparatus," and in the presently pending United States patent application of Dwight W. Batteau and Richard H. Spencer, Ser. No. 108,883, filed May 9, 1961 and titled, "Fluid Contamination Indicator," now abandoned. Other types of sensors may for example use a light beam, or the electrical resistance of the stream, to detect contamination by solid particles.

However, such continuous fluid purity monitors will not accurately test fluids of high purity. For quite pure fluids, the variation caused by a few solid particles in the stream will be so slight as to produce no noticeable reaction by the monitor. For this reason, it has been necessary to test pure fluid streams in some other way, such as by intermittently sampling the stream and filtering the sample to detect any solid particle contaminants. While this will detect contamination of quite pure fluids, it will not give either a continuous or an immediate indication of the purity of the fluid, as is often desired. In fact, for some applications, such as testing jet fuel as it is dispensed, the testing system should both continuously monitor the purity of the jet fuel, and instantaneously indicate impure fuel, for even a small amount of impure fuel may cause a flame-out or severe loss of power, and cannot be tolerated.

The primary object of the present invention is to achieve a fluid purity monitoring system which will continuously and accurately test a fluid stream, even one of high purity, for contamination by solid particles, and instantaneously indicate the degree of purity of the stream.

The fluid purity monitoring system of the present invention operates on the principle of first continuously concentrating the major portion of any solid particles which may contaminate a fluid stream into a minor fraction of the stream, and then continuously testing and indicating the contamination of the minor fraction of the fluid stream, thereby proportionately indicating the contamination of the total fluid stream. By concentrating the major portion of the particles into a minor fraction of the main stream being tested, and segregating that minor fraction, a more contaminated stream fraction is obtained. This in turn enables known fluid purity monitors to be used to accurately and continuously sense the purity of the now contaminated stream fraction, even though the original fluid stream may have been too pure for the monitor to test.

In the preferred embodiment of the invention, the system includes a hydraulic cyclone which continuously concentrates by centrifugal action the major portion of the solid particles contaminating the main fluid stream being tested into a minor fraction of the stream. The cyclone separates and discharges two separate stream fractions, one of which is the minor, now contaminated fraction of the incoming fluid stream. This minor, contaminated fraction is fed through a fluid purity monitor, which preferably electrically responds to changes in the stream's capacitance, thereby instantaneously indicating the degree of contamination of the stream by solid particles. The fluid testing system also preferably includes structure to vary the relative volumes of the fluid stream fractions, and structure to recombine the fractions after the contaminated fraction flows through the fluid purity monitor.

The preferred embodiment of the invention will be further described in connection with the accompanying single figure of drawing which schematically illustrates a continuous fluid purity monitoring system.

In the preferred continuous fluid purity monitoring system, the stream of fluid to be tested is tangentially fed into a hydraulic cyclone 10 by an inlet 12. As this fluid spirals down about the conical wall of the cyclone, the resultant centrifugal action concentrates the major portion of any solid particles contaminating the fluid stream into the outer layer, or fraction, of the spiraling stream. By the time the stream reaches the bottom of the cyclone separator, the outer fraction of the fluid stream contains the major portion of the contaminating particles. At this point, the outer fraction passes through a discharge chamber 14 and is thereby separated from the main body of the fluid stream, now the major fraction of the fluid stream. Preferably, a screen 16 is mounted in the discharge chamber for filtering relative large particles, such as particles larger than 200 microns. The high velocity of the fluid flowing generally tangentially past the screen 16 tends to sweep the screen clean of any filtered particles. Thus, the screen will not tend to clog up and restrict the discharge of the minor, contaminated fraction through the discharge chamber 14. The centrifugal action of the cyclone also separates any entrained air in the incoming, main fluid stream from the minor, contaminated fraction, the air flowing back up through the cyclone with the major fraction of the fluid stream. Accordingly, the purity sensing system is not affected by entrained air, but only by solid particle contaminants.

The filtered, minor, now contaminated fraction of the main fluid stream flows from the discharge chamber 14 through a conduit 18 to a purity monitor or sensor 20. While the purity sensor for continuously monitoring the purity of the fluid stream may be of any satisfactory type, such as those previously mentioned, it is preferred to utilize the purity sensor disclosed in the previously mentioned Batteau et al. application. This purity sensor 20 electrically senses the dielectric constant of the stream and responds to changes in the stream's capacitance, thereby indicating the degree of contamination by solid particles of the stream flowing through it. In most such purity sensors, the stream flows between the plates of a capacitor, the sensor producing an electrical output signal varying in direct relation to the number of solid particles in the fluid stream flowing between the capacitor's plates. This output signal may be applied to an electric meter to visually indicate the degree of contamination of the fluid stream.

The minor, contaminated fluid fraction then flows from the purity sensor through a conduit 22 to a flow sensor 24, which may be a pressure responsive switch that electrically energizes a lamp to visually indicate to the operator that fluid is flowing through the purity sensor. From the flow sensor 24, the fluid fraction flows through a conduit 26 to a flow regulator 28, which preferably is a needle valve.

It is preferred to place the purity sensor immediately downstream of the cyclone's discharge chamber, and the flow sensor and flow regulator downstream of the purity sensor, as illustrated. In this way, even though the flow sensor and particularly the flow regulator tend to gradually collect particles, and to release them in bursts, the purity sensor will not be affected by these bursts and will continue to give an accurate, steady indication of fluid purity.

The major, pure fraction of the fluid stream spiraling down through the cyclone flows back up through the cyclone to an upper discharge port 30. From this discharge port, the major, pure fraction flows through a conduit 32 to a flow regulator 34, which also may be a needle valve. The fluid fractions flowing from flow regulators 28 and 34 preferably are recombined in a common outlet conduit 36.

The flow regulators 28 and 34 may be adjusted to vary the relative proportions of the contaminated and pure fractions flowing from the cyclone. It is preferred with the present system to proportion the adjustment of the flow regulators to divide a 1.3 gallons per minute (g.p.m.) main, incoming stream flow into a 0.3 g.p.m. contaminated fraction flow through the lower discharge chamber 14, and a 1.0 g.p.m. pure fraction flow through the upper discharge port 30. At these flow rates, the hydraulic cyclone will concentrate approximately 80% (by weight) of the solid particles in the main stream into the minor contaminated fraction, while approximately 20% (by weight) of the particles will remain in the major, pure fraction. Thus, approximately one-quarter of the main stream flows through the purity sensor, and it carries approximately 80% of the contaminating particles. By concentrating the contaminating particles into a much smaller volume of fluid in this way, in effect, the purity sensor is testing a fluid stream having a much greater degree of contamination than is present in the main, incoming stream. Because of this relative increase in contamination of the fluid stream, it is possible to test quite pure fluid streams with known continuous fluid purity monitors, such as those previously cited. This would not be possible if the incoming, high purity fluid stream were fed directly to the purity monitor.

From tests performed with the present system, it seems that the system also yields another benefit. It appears that the cyclone bunches exceedingly fine particles, such as red iron oxide particles, into clumps which the purity sensor, not ordinarily sensitive to exceedingly fine particles, now senses. Accordingly, it appears that with the present system it is possible for the purity sensor to detect smaller particles than it ordinarily senses.

While a preferred embodiment of the invention has been described, it will be understood by those skilled in this art that modifications may be made in the preferred embodiment without departing from the spirit or scope of the invention.

I claim:

1. A system for continuously testing the contamination of a fluid stream by solid particles comprising means for continuously concentrating the major portion of the particles into a minor fraction of the fluid stream to thereby substantially increase the contamination of the minor fraction, means to separate the minor, contaminated fraction from the major fraction of the fluid stream, means to vary the relative proportions of the minor and major fractions, means to continuously determine the contamination of only the minor fraction, and means to recombine the major and minor fractions of the fluid stream.

2. Apparatus for testing the purity of a liquid stream contaminated by solid particles which comprises an hydraulic cyclone separator, means for flowing the liquid to be tested into the cyclone, the fluid in the cyclone being separated into a minor stream containing the major portion of the solid particles and a major stream, a conduit connected to the cyclone through which the minor stream is discharged, a purity sensor connected to the conduit through which the minor stream is passed, a second conduit connected to the sensor for the passage of the minor stream from the sensor, a flow regulating means in the second conduit for regulating the flow of the minor stream, a third conduit connected to the cyclone through which the major stream flows, a flow regulating means in the third conduit for regulating the flow of the major stream, the two regulating means being operable to regulate the amount of liquid flowing into the cyclone, and means for discharging the streams from the second and third conduits.

References Cited
UNITED STATES PATENTS

| | | | |
|---|---|---|---|
| 1,601,383 | 9/1926 | Todd | 73—53 X |
| 2,225,798 | 12/1940 | Price | 73—422 |
| 2,906,404 | 9/1959 | Orelli et al. | 210—512 |
| 2,997,874 | 8/1961 | Billuris et al. | 73—61 |
| 3,167,949 | 2/1965 | Stenzel et al. | 73—61 X |
| 3,215,272 | 11/1965 | Sweeney | 210—512 X |

DAVID SCHONBERG, *Primary Examiner.*